United States Patent
Kassaei et al.

(10) Patent No.: US 9,571,285 B2
(45) Date of Patent: *Feb. 14, 2017

(54) IDENTITY ASSERTION FRAMEWORK

(71) Applicant: eBay Inc., San Jose, CA (US)

(72) Inventors: Farhang Kassaei, Saratoga, CA (US);
Neeti Deshmukh, San Jose, CA (US);
Peter Johnson, Campbell, CA (US);
Franco Travostino, San Jose, CA (US);
Sachin Khanna, San Jose, CA (US);
Anand Bahety, San Jose, CA (US);
Benoy Antony, Santa Clara, CA (US)

(*) Notice: Subject to any disclaimer, the term of this patent is extended or adjusted under 35 U.S.C. 154(b) by 60 days.

This patent is subject to a terminal disclaimer.

(21) Appl. No.: 14/624,342

(22) Filed: Feb. 17, 2015

(65) Prior Publication Data

US 2015/0163251 A1    Jun. 11, 2015

Related U.S. Application Data

(63) Continuation of application No. 13/029,871, filed on Feb. 17, 2011, now Pat. No. 8,990,557.

(51) Int. Cl.
*H04L 9/32* (2006.01)
*G06F 21/33* (2013.01)
*H04L 29/06* (2006.01)

(52) U.S. Cl.
CPC ........... *H04L 9/3234* (2013.01); *G06F 21/335* (2013.01); *H04L 63/20* (2013.01)

(58) Field of Classification Search
CPC .................................................... H04L 9/3234
See application file for complete search history.

(56) References Cited

U.S. PATENT DOCUMENTS

| 8,990,557 B2 | 3/2015 | Kassaei et al. | |
| 2004/0128392 A1* | 7/2004 | Blakley, III | H04L 63/083 709/229 |
| 2004/0128393 A1* | 7/2004 | Blakley, III | H04L 63/0807 709/229 |

(Continued)

OTHER PUBLICATIONS

Shim et al.; Federated identity management; Published in: Computer ( vol. 38, Issue: 12, Dec. 2005 ); pp. 120-122; IEEE Xplore.*

(Continued)

*Primary Examiner* — Bradley Holder
(74) *Attorney, Agent, or Firm* — Schwegman, Lundberg & Woessner, P.A.

(57) ABSTRACT

Systems and methods for implementing an identity assertion framework to authenticate a user in a federation of security domains are provided. A first security token service associated with a first security domain is configured to receive a request for a first token from a device and issue the first token based on a first issuing policy of the first security domain. A token authenticator associated with a second security domain is configured to determine that the first token is not issued in the second security domain. A hardware-processor-implemented second security token service is configured to receive the first token from the token authenticator, determine that the first token was issued by the first security token service, and validate the first token based on a local federation policy that defines a federation agreement between the first security domain and the second security domain.

17 Claims, 6 Drawing Sheets

(56) References Cited

U.S. PATENT DOCUMENTS

| | | | |
|---|---|---|---|
| 2004/0128506 A1* | 7/2004 | Blakley, III | H04L 63/0815 713/170 |
| 2004/0128541 A1* | 7/2004 | Blakley, III | H04L 63/0815 726/9 |
| 2004/0128542 A1* | 7/2004 | Blakley, III | H04L 63/0281 726/12 |
| 2004/0128546 A1* | 7/2004 | Blakley, III | G06F 21/6245 726/8 |
| 2005/0201364 A1* | 9/2005 | Dalton, Jr. | H04L 45/00 370/352 |
| 2005/0223413 A1* | 10/2005 | Duggan | G06F 21/6236 726/3 |
| 2006/0020679 A1* | 1/2006 | Hinton | G06F 21/41 709/217 |
| 2006/0021018 A1* | 1/2006 | Hinton | H04L 63/06 726/10 |
| 2006/0021019 A1* | 1/2006 | Hinton | G06F 21/41 726/10 |
| 2006/0048216 A1* | 3/2006 | Hinton | H04L 63/0815 726/8 |
| 2006/0085633 A1* | 4/2006 | Balfanz | G06Q 20/02 713/155 |
| 2006/0123234 A1* | 6/2006 | Schmidt | H04L 63/0209 713/168 |
| 2006/0123472 A1* | 6/2006 | Schmidt | G06F 21/41 726/8 |
| 2006/0136990 A1* | 6/2006 | Hinton | H04L 63/0815 726/2 |
| 2006/0218628 A1* | 9/2006 | Hinton | H04L 63/0815 726/8 |
| 2006/0236382 A1* | 10/2006 | Hinton | H04L 63/0815 726/8 |
| 2007/0094400 A1* | 4/2007 | Childress | G06F 8/61 709/229 |
| 2007/0136603 A1* | 6/2007 | Kuecuekyan | G06F 21/6218 713/185 |
| 2007/0234417 A1 | 10/2007 | Blakley III et al. | |
| 2007/0255958 A1* | 11/2007 | Schmidt | G06F 21/335 713/183 |
| 2008/0010665 A1* | 1/2008 | Hinton | G06F 21/41 726/1 |
| 2008/0021866 A1* | 1/2008 | Hinton | G06Q 10/10 |
| 2008/0021997 A1* | 1/2008 | Hinton | H04L 63/0815 709/225 |
| 2009/0094383 A1* | 4/2009 | Hinton | G06F 21/41 709/250 |
| 2009/0193288 A1* | 7/2009 | Kakivaya | H04L 63/20 714/4.1 |
| 2009/0254745 A1* | 10/2009 | Ganesan | H04L 63/06 713/151 |
| 2010/0100924 A1* | 4/2010 | Hinton | G06F 21/10 726/1 |
| 2012/0216268 A1 | 8/2012 | Kassaei et al. | |

OTHER PUBLICATIONS

Satyanarayanan; Integrating security in a large distributed system; Published in: Journal ACM Transactions on Computer Systems (TOCS) TOCS Homepage archive; vol. 7 Issue 3, Aug. 1989; pp. 247-280; ACM Digital Library.*

U.S. Appl. No. 13/029,871, Final Office Action mailed Feb. 28, 2013, 35 pgs.

U.S. Appl. No. 13/029,871, Non Final Office Action mailed Nov. 8, 2012, 30 pgs.

U.S. Appl. No. 13/029,871, Notice of Allowance mailed Nov. 14, 2014, 16 pgs.

U.S. Appl. No. 13/029,871, Response filed Feb. 11, 2013 to Non Final Office Action mailed Nov. 8, 2012, 15 pgs.

U.S. Appl. No. 13/029,871, Response filed Apr. 23, 2013 to Final Office Action mailed Feb. 28, 2013, 14 pgs.

* cited by examiner

IDENTITY ASSERTION FRAMEWORK

CROSS-REFERENCE TO RELATED PATENT DOCUMENTS

This patent application is a continuation of and claims the benefit of priority under 35 U.S.C. §120 to U.S. patent application Ser. No. 13/029,871 entitled "IDENTITY ASSERTION FRAMEWORK," filed on Feb. 17, 2011, which is hereby incorporated by reference herein in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright© 2005-2015, eBay Inc. All Rights Reserved.

FIELD OF INVENTION

Embodiments of the invention relate generally to computer security and more specifically to providing an identity assertion framework.

BACKGROUND

In the area of electronic communications, user authentication is performed to identify and authenticate a particular user. An authentication scheme may include the use of a security token service (STS) that brokers the authentication of the user for one or more web services. The STS issues security tokens to a user device that can be used to authenticate the user to one or more web services.

In some instances, a plurality of web services is grouped into a security domain where the web services each accept the token issued by an STS. A user is authenticated by the STS and may communicate, by virtue of a token issued to the user by the STS, with the web services in that domain. If a user requests access to a web service associated with another security domain, another token is required. In web service federation, the STS associated with the first domain issues a second token to the user that allows the user to request a third token from the STS associated with the second domain.

BRIEF DESCRIPTION OF THE DRAWINGS

Some embodiments are illustrated by way of example and not limitation in the figures of the accompanying drawings in which.

DETAILED DESCRIPTION

Example methods and systems to establish and manage an identity assertion framework are described. In the following description, for purposes of explanation, numerous specific details are set forth in order to provide a thorough understanding of example embodiments. It will be evident, however, to one skilled in the art that aspects of the inventive subject matter described herein may be practiced without these specific details.

Generally speaking, a security token is issued to a user after the user has been authenticated to the security domain using a user ID and password. As used herein, a "security domain" may be defined as an application or collection of applications that trust a common security token for authentication, authorization, or session management. A security domain may be implemented as a set of security policies that governs all of the members of the security domain. Therefore, members of a security domain find the security policies acceptable and do not seek exemption from these policies. Further, if exemption from security domain policies for a member becomes the norm, the membership of that member in the security domain can be questioned, but one or few exemptions may be acceptable under certain circumstances.

In an example embodiment, an identity assertion framework (IAF) can rely on a well-defined security domain model to access and enforce policies governing issuing, consuming, and federating a security token. Security can include, for example, two main sets of entities: members and policies. The members of a security domain can include one or more Relying Parties (RPs) or Service Providers (SPs); one set of policies that includes policies for issuing, consuming, and federating a security token; zero or one Security Token Services (STS); and zero or more primary identity provider (IDPs) that provide a directory of identities that can perform a primary authentication function.

Figure 1:
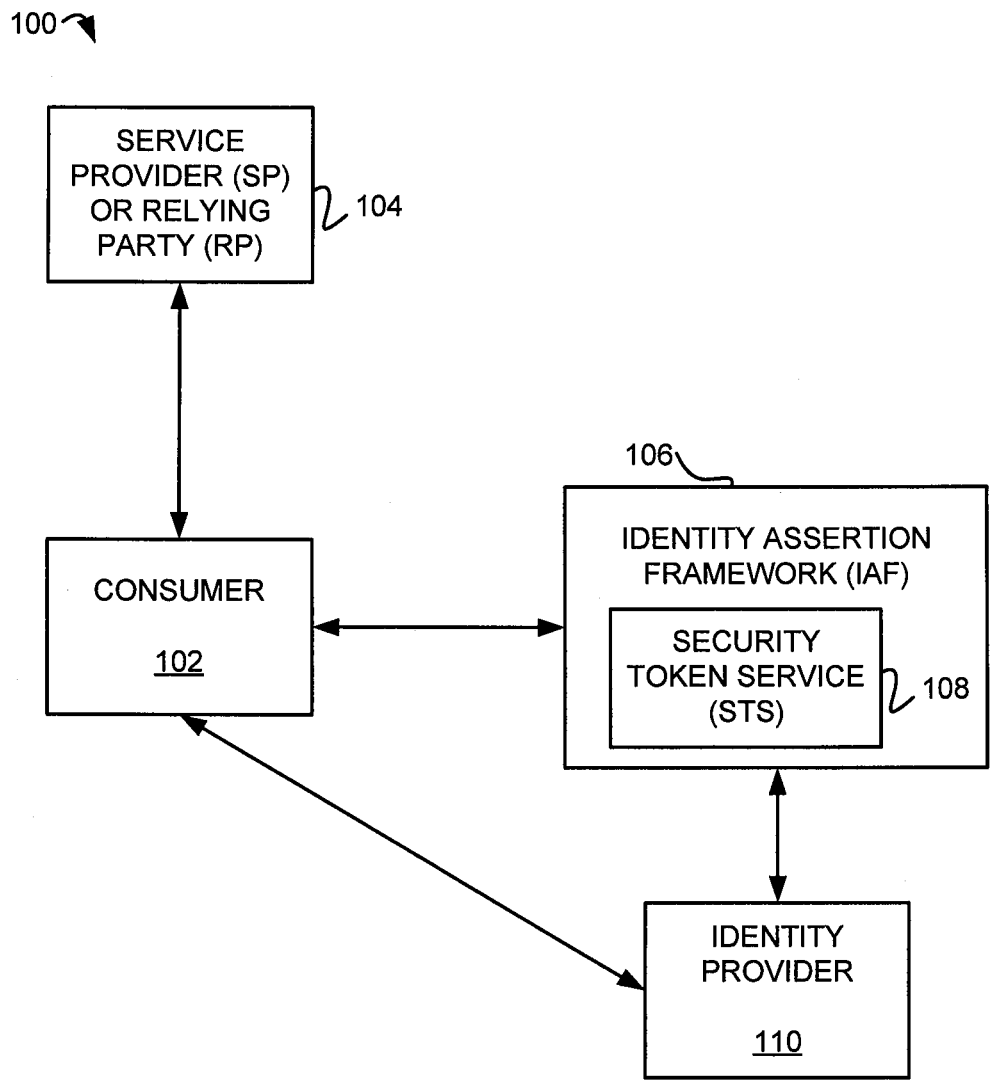
FIG. 1 is a block diagram of an authentication scheme according to some embodiments.

FIG. 1 is a block diagram of an authentication scheme 100 within a security domain according to some embodiments. The authentication scheme 100 is shown to include at least the following entities: a consumer 102, a service provider (SP) or a relying party (RP) 104, an identity assertion framework (IAF) 106, a security token service (STS) 108, and an identity provider 110.

A consumer 102 is an entity that makes a request to a service provider such as an application. The consumer 102 may include a user, an administrator, or a bot such as a web crawler or a spider. A consumer 102 may also be an application that acts on behalf of a user; for example, the application may be an agent of the user. An agent can be trusted or not trusted by the SP or RP 104. The request may be made via a mobile application or a browser. Once the consumer 102 is authenticated by, for example, the identity provider 110, the consumer 102 requests a security token from the STS 108. The security token stores the consumer identity as well as additional information about the consumer 102 as it is known to the identity provider 110. Upon receiving the token, the consumer 102 submits the token to the SP or RP 104 together with the request.

A service provider (SP) or relying party (RP) 104 is a service to which the consumer 102 makes the request and that provides the actual services that the consumer 102 (and/or an agent of the consumer 102) consumes. For brevity, the terms "service provider" and "relying party" are used interchangeably and are inclusive of each other. The SP or RP 104 requires that the consumer 102 be authenticated, but does not perform primary authentication, e.g., the SP or RP 104 does not require its consumers 102 to submit primary credentials (such as user name and password or AppId and Secret) to the SP or RP 104. The SP or RP 104 (or another entity not shown in the authentication scheme 100, such as a guard) may perform token authentication where a token itself is authenticated in the ensuing invocations by at least one SP or RP 104. The SP or RP 104 may or may not be a "service" as understood in the context of a service-oriented architecture (SOA).

In an SOA, however, an SP or RP 104 serves multiple consumers 102 with whom it does not have a pre-existing relationship. For example, a "Check-Out" service can be used by many applications instead of just one particular application. Each SP or RP 104 determines the basic identity of the invoking consumer 102 and additional "assertions" about a consumer 102 (such as how the consumer 102 was authenticated by its primary identity provider, roles assigned to the consumer 102, expiration time for a consumer session, etc.).

The IAF 106 is a federated security token service that federates a plurality of security domains. The security domains may share one or more STSs 108 or be associated with an exclusive STS 108. In some instances, each security domain is associated with only one STS 108. The set of the SP or RP 104 that trust one instance of the IAF 106 is referred to as a trust domain.

An STS 108 is a service that issues (and validates) tokens based on security and identity policies of a security domain. As used herein, tokens comprise a collection of assertions expressed in a standard format and packaged securely according to security domain policies. The STS 108 may recognize tokens issued by other security domains and exchange them for tokens to be used within the security domain.

An Identity Provider (IDP) 110 is an entity with which a consumer 102 provides their identity, e.g., the entity that issues a unique consumer ID and secret and maintains the current life cycle state of an identity of the consumer 102. The IDP 110 may include a directory (e.g., an identity repository) that stores a subject identifier and a primary credential of a subject. The subject may be any identity regardless of role. An internal user, external user, third-party application, internal service, etc., are all subjects. Tokens issued by the STS 108 have at least two subjects: the requesting party (e.g., the SP or RP 104) and the subject of assertions (e.g., the consumer 102).

The IDP 110 provides one or more assertions about the consumer 102. An assertion is a claim made by the IDP 110 about the consumer 102. The assertions may be based on information that the IDP 110 obtained about a subject or a subject's own claims. A claim is an admission made by a subject about itself, e.g., "my email address is jane@company.com" or "my phone number is 408-555-1234." To provide an assertion to an agent of the subject, the subject may provide an authorization indicating that the subject consents to the agent obtaining a security token on its behalf so that the agent can request services from the SP or RP 104.

If the IDP 110 is trusted by the SP or RP 104, the IDP 110 is allowed to perform initial authentication of the subject based on a received a primary credential. Initial authentication is the process of obtaining and verifying a subject's primary credentials. A primary credential is a subject's credentials that are normally obtained during a provisioning process. The simplest form of primary credential is an identifier and a secret (also known as user name and password).

Figure 2:
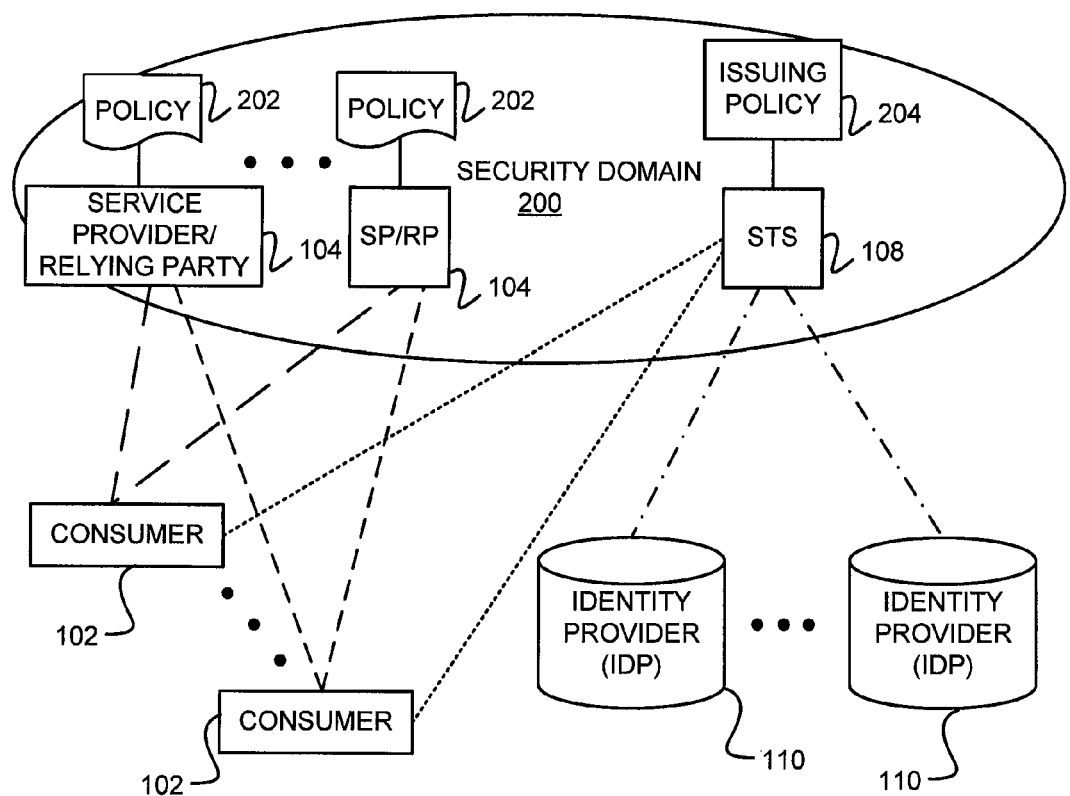
FIG. 2 is a network diagram depicting an example of a security domain within which one example embodiment may be deployed.

FIG. 2 is a network diagram depicting an example of a security domain 200 within which one example embodiment may be deployed. The security domain 200 is an organization or sub-organization that sets policies for the SP or RP 104 and the consumer 102 so that the consumer 102 is authenticated before services are provided. In operation, a set of one or more policies 202 are set by organizations or sub-organizations and are agreed to (and honored by) all services and consumers that are part of the organization. For example, "Site Applications" may be members of the security domain 200. All its member applications (e.g., Bid, Buy, Checkout, etc.) honor the domain identity and authentication policies included in the one or more policies 202. This agreement may result in all identity assertions being expressed and packaged in a standard form (e.g., marketplace cookies) and that all the SP or RP 104 accept and honor these assertions. The STS 108 in the security domain 200 mints security tokens according to an issuing policy 204. The issuing policy 204 may include assertions that can be expressed, confidentiality mechanisms, integrity mechanisms, session and freshness polices, etc. The STS 108 in the security domain 200 may accept assertions provided by one or more IDPs 110.

Figure 3:
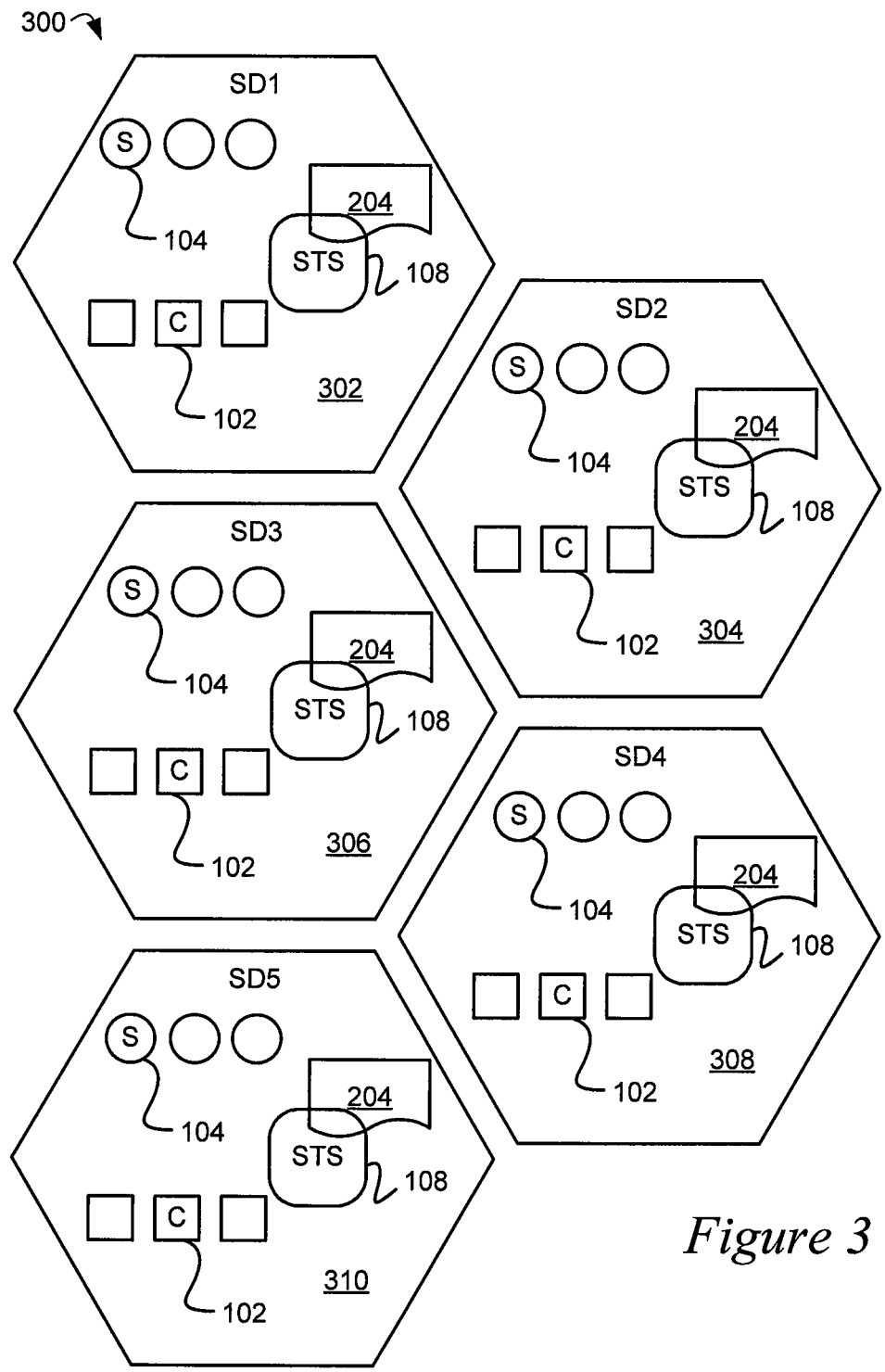
FIG. 3 is an architecture diagram of a plurality of security domains within a federation having no central authority.
Figure 4:
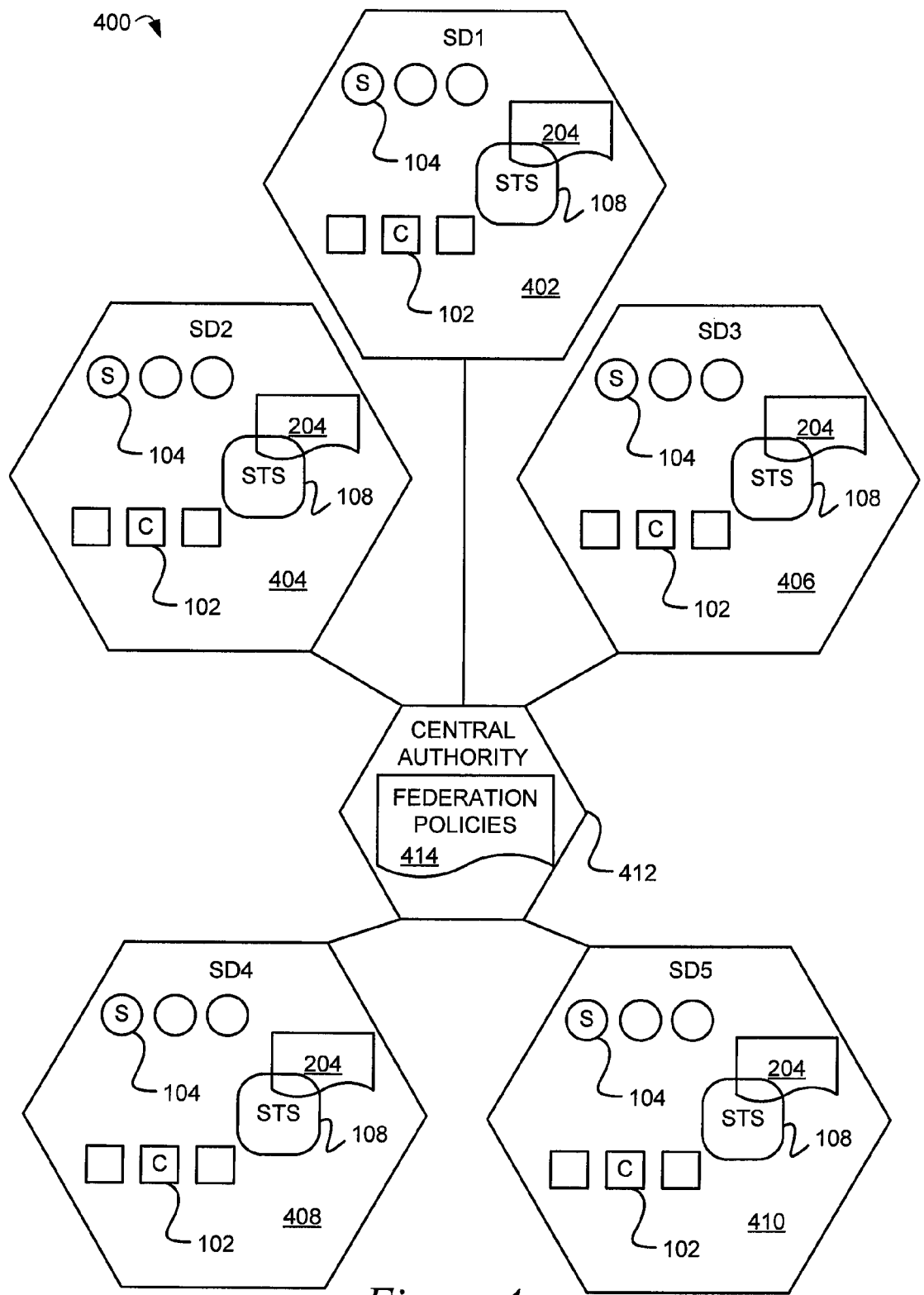
FIG. 4 is an architecture diagram of a plurality of security domains within a federation having a central authority.

In some embodiments, a third-party developer program may form a second domain (see, e.g., FIGS. 3 and 4). All of the second domain's service providers (Shopping API, Trading API, Finding APIs) and consumers (all third-party applications) honor a second set of policies (e.g., the one or more policies 202 and the issuing policy 204) and identity assertions. It is noted that the consumers 102 are not allowed to use security tokens from the security domain 200 to invoke a service from another domain.

In some instances, two or more security domains may form a federation. A federation is a collection of security domains that agree to honor one set of policies, typically to allow one domain consumer to invoke/consume another domain's service provider. To implement a federation, a domain member (e.g., the consumer 102) first obtains a security token within an origin domain, then it can exchange this token with a federated token. A federated token is a token that is accepted by all members of a federation regardless of origin domain. Alternatively, the domain member may, via a federated token service, exchange its token with a token of the target domain.

To provide the ability to form a federation, an identity assertion framework (IAF) is used. Two examples of IAF are described in FIGS. 3 and 4. The IAF may include an SOA-based STS 108 having an initial authentication facility (e.g., the IDP 110), a token authenticator, and tools to manage the one or more policies 202 and the issuing policy 204. The IAF may support Security Assertion Markup Language (SAML), Open Authorization (OAuth), and custom tokens. The IAF may support multiple encoding and compression to optimize token sizes. Examples of multiple encoding include Extensible Markup Language (XML), Minified XML, JavaScript Object Notation (JSON), and binary encoding. Further, the IAF may support multiple "algorithm suites" for encryption and signature generation and pluggable authentication module (PAM) to connect to the IDPs 110.

A federation may be defined using a table such as Table 1, below. Table 1 may capture the federation agreements among security domains by defining the cross-domain authentication agreements that allow the consumer 102 of one security domain 200 to invoke a service from a different domain.

TABLE 1

| To  | From | SD1 | SD2 | SD3 | SD4 |
|-----|------|-----|-----|-----|-----|
| SD1 |      | —   | No  | Yes | No  |
| SD2 |      | Yes | —   | No  | No  |
| SD3 |      | Yes | Yes | —   | No  |
| SD4 |      | Yes | No  | Yes | —   |

FIG. 3 is an architecture diagram of a plurality of security domains within a federation 300 having no central authority. In this example embodiment, each security domain of the plurality of security domains includes groups of the SPs or RPs 104 that may be grouped according to function or according to security level. As depicted, each security domain (e.g., SD1 302, SD2 304, SD3 306, SD4 308, SD5 310) respectively includes one or more SP or RP (e.g., the SP or RP 104), one or more consumers (e.g., the consumer 102), and one STS 108 having an issuing policy 204. The issuing policy 204 is a set of policy statements that is accessed by an STS and provides instructions to issue a token and defines data to be stored in an issued token.

Initially, the consumer 102 acquires an initial authentication at a first SP or RP 104. The first SP or RP 104 is included in a first security domain (e.g., SD2 304). The consumer 102 obtains a first token local to SD2 304 that is valid for another SP or RP 104 in SD2 304. To invoke an SP or RP 104 in a separate domain (e.g., SD3 306), a token authenticator (or guard) at the other SP or RP 104 in SD2 304 examines the first token and determines that it is not issued by SD3 306. At this point, the token authenticator may invoke its local IAF instance exchange token, pass the SD2 local security token and ask its local IAF what to do. Alternatively, the token authenticator examines its own local federation agreement, and if it finds an agreement between SD2 304 and SD3 306, it calls the SD IAF instance directly to validate the token.

If there is a federation between SD2 304 and SD3 306, the STS 108 of SD3 306 invokes the SD3 IAF instance to examine its policies 204 to see whether SD3 306 has a federation agreement with SD2 304. If SD3 306 does have a federation agreement with SD2 304, the SD3 IAF instance validates the token by calling the SD2 IAF instance or locally validating the token if a key has already been exchanged between the two domains (see FIG. 5). The SD3 IAF instance returns a new SD3 token (minted SD3 IAF) to the consumer 102 and now the SP or RP 104 in SD3 306 can proceed and validate the token.

If there is no federation between SD2 304 and SD3 306, the SD3 IAF instance examines its federation agreement and does not find a federation agreement for SD2 304, it returns an error in response to the request.

FIG. 4 is an architecture diagram of a plurality of security domains (SD1 402, SD2 404, SD3 406, SD4 408, and SD5 410) within a federation 400 having a central authority 412. In this example embodiment, the central authority 412 may be implemented using an enterprise service bus (ESB). In these embodiments, the policies are centralized and there is either no need to exchange keys among domains or, if domains prefer to keep their own encryption secret and algorithms, the keys can be managed centrally.

In this example, a consumer 102 in SD2 404 invokes an SP or RP 104 in SD3 406 and attempts to access an SP or RP 104 in SD 408 via the central authority 412. The central authority 412 examines both the origin security domain and the destination security domain of the requests and matches the pair to its federation policies 414 and configurations. The federation policies 414 are managed and accessed by the central authority 412.

If the central authority 412 does find a federation policy 414 between SD2 404 and SD3 406, it routes the request through. The central authority 412 may alternatively transform the token submitted with the original call from the consumer 102 at SD2 404 to another token (either a Federation token or SD3 local security token) in the process. If the central authority 412 does not find a matching federation policy 414, the central authority 412 does not route the request to the other service provider and returns an error to the consumer 102.

Figure 5:
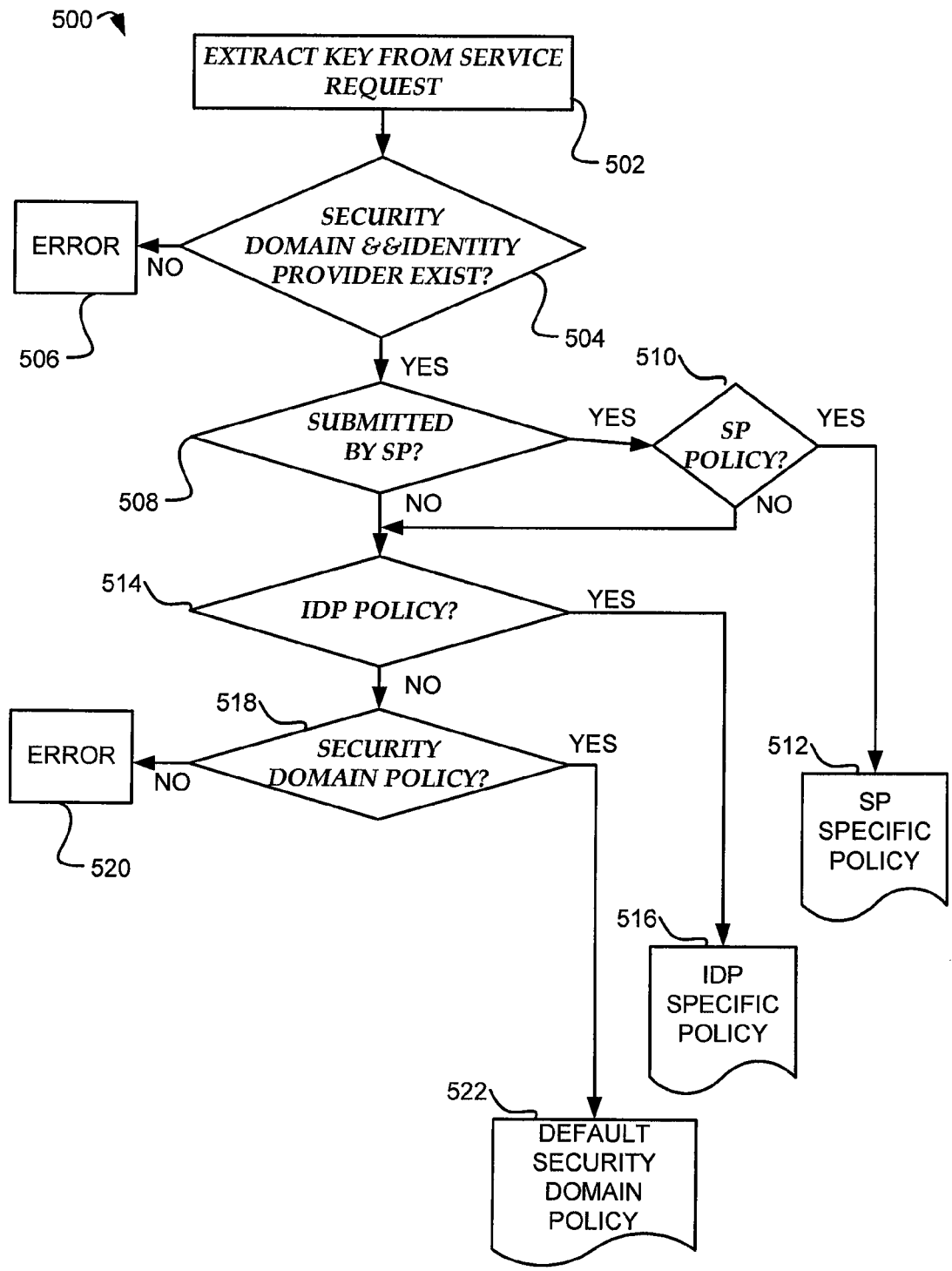
FIG. 5 is a flowchart depicting a process for resolving policies within a federation.

FIG. 5 is a flowchart depicting a process 500 for resolving policies within a federation. The IAF uses a logical key to access the applicable policy to a request that a token be issued. The key may be defined as, for example, Key={Security Domain, Identity Provider, SP/RP} where "Security Domain" is a unique identifier designating the security domain (e.g., security domain 200). The "Identity Provider" identifies the IDP (e.g., IDP 110) with which the requesting consumer 102 provided its identity. The "SP/RP" is the SP or RP 104 that the consumer is obtaining the token for, this is optional. Both the Identity Provider 110 and the SP or RP 104 may be passed as part of the request. The Identity Provider 110 is included in the subject and the SP or RP 104 is passed in optionally by the consumer 102 (in consumer-initiated sequence) or included in the redirect request by the SP or RP 104 (in RP-initiated sequence). The IAF instance obtains the Security Domain identifier through its configuration; each IAF instance is associated with one security domain.

The key is resolved to a policy using the process 500 of FIG. 5. The IAF includes, for example, three levels of policy from the most generic at the security domain level to the most specific at the SP/RP level. The STS 108 within the IAF attempts to match the key to the most specific policy it can find.

In an operation 502, the key is extracted from the service request. In an operation 504, a determination is made as to whether the security domain and the IDP identified in the key exist. If the security domain and the IDP identified in the key do not exist, an error is returned in operation 506.

If the security domain and the IDP exist, a determination is made in operation 508 as to whether the request was submitted by the SP or RP 104. If the request was submitted by the SP or RP 104, a further determination is made in operation 510 as to whether the SP or RP 104 has an SP-specific policy. If the SP is associated with an SP specific-policy, the SP specific policy is used in operation 512. The SP-specific policy can protect (and add security) when a particular SP in a domain can be accessed over a channel that is not as secure as the general security domain policy assumes. For example, a default security domain policy may request a signed token but not an encrypted token that has a 24-hour time-to-live (TTL). This assumption may be sufficient for all services in the domain, but if a particular service in this domain can be accessed from outside (e.g., by the members of a different IDP), the service provider may require an encrypted token that expires after one hour.

If, in operation 508, the request was not submitted by the SP or RP 104, a determination is made in operation 514 whether the IDP 110 has a specific policy. If the IDP 110 is associated with a specific policy, the IDP-specific policy is used in operation 516. The IDP-specific policy may be used in cases where a domain includes more than one IDP and SPs that are part of the domain specify policies for each IDP. An example is a service that can be invoked by internal users as well as external users. For internal users, the service may accept a token that is neither encrypted nor signed, but to external users the service requests an encrypted and signed token.

If it is determined in operation 518 that neither the SP-specific policy nor the IDP-specific policy is identified, the default security domain policy is used in operation 522. If it is determined in operation 518 that the default security domain policy is missing, an error is returned in operation 520.

Figure 6:
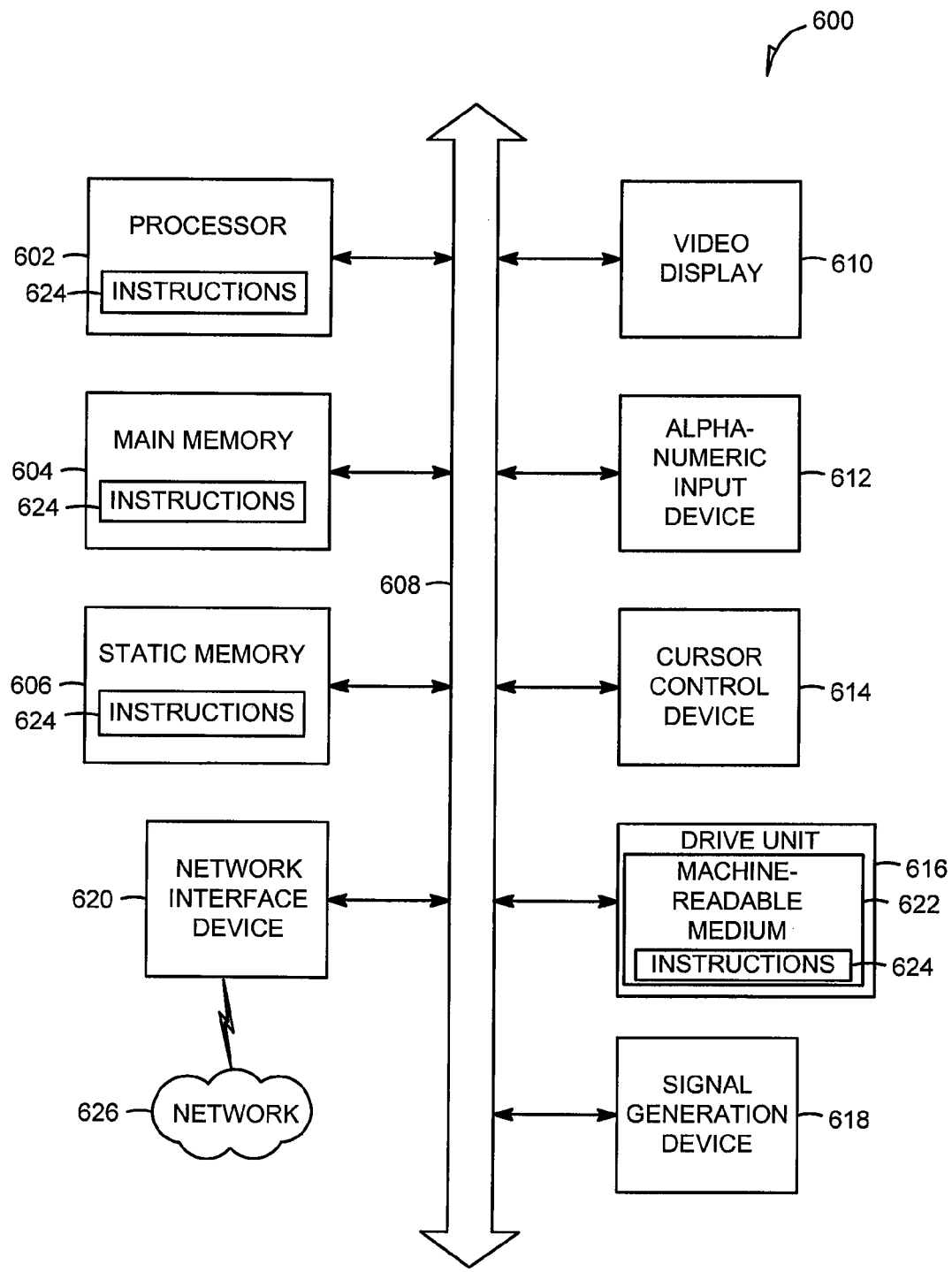
FIG. 6 is a diagrammatic representation of a machine in the example form of a computer system within which a set of instructions for causing the machine to perform any one or more of the methodologies discussed herein may be executed.

FIG. 6 is a diagrammatic representation of machine in the example form of a computer system 600 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes at least one processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620. The computer system 600 may include a touchscreen.

The disk drive unit 616 includes a machine-readable medium 622 on which is stored one or more sets of instructions (e.g., software) 624 embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 626 via the network interface device 620.

While the machine-readable medium 622 is shown in an example embodiment to be a single medium, the term "machine-readable medium" or "non-transitory machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the inventive subject matter presented herein. The term "machine-readable medium" shall accordingly be taken to include, but not be limited to, solid-state memories, optical, and magnetic media.

Example systems and methods to provide an identify assertion framework have been provided. In some instances, the identity assertion framework may provide a technical solution to technical problems such as, but not limited to, requiring few user authentications, thus increasing network efficiency and improving network security. Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A system comprising:
a hardware-processor-implemented first security token service associated with a first security domain and configured to:
receive a request for a first token from a consumer and
issue the first token based on a first issuing policy of the first security domain, wherein the first token is valid for one or more service providers within the first security domain;
a hardware-processor-implemented token authenticator associated with the first security domain and configured to determine that the first token is not issued in a second security domain; and
a hardware-processor-implemented second security token service configured to:
receive the first token from the token authenticator,
determine that the first token was issued by the first security token service, and
validate the first token based on a local federation policy that defines a federation agreement between the first security domain and the second security domain.

2. The system of claim 1, wherein the first issuing policy provides instructions to issue tokens and defines data to be stored in the issued tokens.

3. The system of claim 1, wherein the hardware-processor-implemented second security token service is associated with the second security domain and is further configured to:
invoke a processor-implemented identity assertion framework instance associated with the second security domain to examine one or more issuing policies of the second security domain to determine that the second security domain has the federation agreement with the first security domain.

4. The system of claim 1, wherein the validating the first token based on the local federation policy includes verifying that a key has been exchanged between the first security domain and the second security domain.

5. The system of claim 1, further comprising a processor-implemented identity provider configured to perform an initial authentication of the consumer.

6. The system of claim 1, further comprising a processor-implemented central authority configured to issue a federation token based on identifying a centralized federation policy of the central authority that defines a further federation agreement between the first security domain and the second security domain, the federation token being valid to a first service provider in the first security domain and to a second service provider in the second security domain, and being accepted by the first service provider in the first security domain and the second service provider in the second security domain in allowing the consumer to invoke consumer sessions.

7. A method comprising:
receiving a request for a first token from a consumer, using a first security token service implemented with a hardware processor and associated with a first security domain;
issuing the first token, using the first security token service, based on a first issuing policy of the first security domain, wherein the first token is valid for one or more service providers within the first security domain;
determining, using a token authenticator implemented with a hardware processor in the first security domain, that the first token is not issued in a second security domain; and
using a second security token service implemented with a hardware processor:
receiving the first token from the token authenticator;
determining that the first token was issued by the first security token service; and
validating the first token based on a local federation policy that defines a federation agreement between the first security domain and the second security domain.

8. The method of claim 7, wherein the first issuing policy provides instructions to issue tokens and defines data to be stored in the issued tokens.

9. The method of claim 7, further comprising:
invoking an identity assertion framework instance associated with the second security domain to examine one or more issuing policies of the second security domain to determine that the second security domain has the federation agreement with the first security domain.

10. The method of claim 7, wherein the validating the first token based on the local federation policy includes verifying that a key has been exchanged between the first security domain and the second security domain.

11. The method of claim 7, further comprising:
performing an initial authentication of the consumer.

12. The method of claim 7, further comprising:
issuing a federation token based on identifying a centralized federation policy of a central authority that defines a further federation agreement between the first security domain and the second security domain, the federation token being valid to a first service provider in the first security domain and to a second service provider in the second security domain, and being accepted by the first service provider in the first security domain and the second service provider in the second security domain in allowing the consumer to invoke consumer sessions.

13. A non-transitory machine-readable medium comprising instructions that when executed by one or more hardware processors of a machine, cause the machine to perform operations comprising:
receiving a request for a first token from a consumer, using a first security token service associated with a first security domain;
issuing the first token, using the first security token service, based on a first issuing policy of the first security domain, wherein the first token is valid for one or more service providers within the first security domain;
determining, using a token authenticator in the first security domain, that the first token is not issued in a second security domain; and
using a second security token service:
receiving the first token from the token authenticator;
determining that the first token was issued by the first security token service; and
validating the first token based on a local federation policy that defines a federation agreement between the first security domain and the second security domain.

14. The non-transitory machine-readable medium of claim 13, wherein the first issuing policy provides instructions to issue tokens and defines data to be stored in the issued tokens.

15. The non-transitory machine-readable medium of claim 13, the operations further comprising:
invoking an identity assertion framework instance associated with the second security domain to examine one or more issuing policies of the second security domain to determine that the second security domain has the federation agreement with the first security domain.

16. The non-transitory machine-readable medium of claim 13, wherein the validating the first token based on the local federation policy includes verifying that a key has been exchanged between the first security domain and the second security domain.

17. The non-transitory machine-readable medium of claim 13, the operations further comprising:
performing an initial authentication of the consumer.

* * * * *